United States Patent
Zhou

(10) Patent No.: US 10,353,596 B2
(45) Date of Patent: Jul. 16, 2019

(54) DATA STORAGE SYSTEM PERFORMANCE MANAGEMENT

(71) Applicant: International Business Machines Corporation, Armonk, NY (US)

(72) Inventor: Xue Qiang Zhou, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 98 days.

(21) Appl. No.: 15/718,266

(22) Filed: Sep. 28, 2017

(65) Prior Publication Data
US 2019/0095109 A1   Mar. 28, 2019

(51) Int. Cl.
*G06F 12/00* (2006.01)
*G06F 3/06* (2006.01)

(52) U.S. Cl.
CPC .......... *G06F 3/0613* (2013.01); *G06F 3/0647* (2013.01); *G06F 3/0659* (2013.01); *G06F 3/0688* (2013.01)

(58) Field of Classification Search
None
See application file for complete search history.

(56) References Cited

U.S. PATENT DOCUMENTS

| | | | | |
|---|---|---|---|---|
| 8,402,061 B1* | 3/2013 | Briggs | ...... | G06F 16/13 707/791 |
| 8,566,553 B1* | 10/2013 | Marshak | ...... | G06F 3/0619 711/170 |
| 9,727,244 B2* | 8/2017 | Camp | ...... | G06F 12/1009 |
| 10,042,578 B2* | 8/2018 | Karve | ...... | G06F 3/0683 |
| 2013/0111160 A1* | 5/2013 | Benhase | ...... | G06F 12/121 711/160 |
| 2013/0124780 A1* | 5/2013 | Baderdinni | ...... | G06F 3/061 711/103 |
| 2013/0290598 A1* | 10/2013 | Fiske | ...... | G06F 3/0625 711/103 |
| 2016/0253121 A1 | 9/2016 | Guo et al. | | |
| 2016/0299711 A1 | 10/2016 | Bolik et al. | | |

(Continued)

OTHER PUBLICATIONS

Chen et al., "Hystor: Making the Best Use of Solid State Drives in High Performance Storage Systems", ICS'11, May 31-Jun. 4, 2011, pp. 1-11, Copyright 2011 ACM.

(Continued)

*Primary Examiner* — John A Lane
(74) *Attorney, Agent, or Firm* — Nathan M. Rau

(57) ABSTRACT

A computer system can dynamically manage the performance of a data storage system that includes sets of data storage devices. One set of the data storage devices can include read-intensive (RI) solid-state drives (SSDs). The computer system can detect, in response to a specified number of input/output operations per second (IOPS) of data contained on the RI SSDs exceeding the access density of the RI SSDs divided by the portion of data locations of the RI SSDs containing the data, a free area within the RI SSDs having space for additional data. Additional data within the data storage system that has a required access time less than a specified access time threshold and an access frequency less than a specified access frequency threshold can also be detected. In response, the detected additional data can be moved to the free area within the RI SSDs.

18 Claims, 7 Drawing Sheets

(56) References Cited

U.S. PATENT DOCUMENTS

2017/0262178 A1* 9/2017 Hashimoto ........... G06F 3/0604

OTHER PUBLICATIONS

Hewlett Packard, "Adaptive Optimization for HPE 3PAR StoreServ Storage", Hybrid storage on HPE 3PAR StoreServ, Technical white paper, pp. 1-25, © Copyright 2012-2016 Hewlett Packard Enterprise Development LP.
Zhang et al., "Adaptive Data Migration in Multi-tiered Storage Based Cloud Environment", 2010 IEEE 3rd International Conference on Cloud Computing, Jul. 5-10, 2010, pp. 1-8.
IBM, "Read intensive SSDs", IBM Knowledge Center, Last updated: Tue, Feb. 7, 2017, pp. 1-4.
Dell, "Fully Automated Storage Tiering (FAST)", Dell EMC Glossary, printed on Mar. 1, 2017, 1 page, Copyright 2017 EMC Corporation.
Mell et al., "The NIST Definition of Cloud Computing", Recommendations of the National Institute of Standards and Technology, Special Publication 800-145, Sep. 2011, 7 pages.

* cited by examiner

200 Data Storage Device Access
time and Access Density

|        | Access Time | Access Density |
|--------|-------------|----------------|
| HE SSD | 0.7 ms      | 125 /GB/S      |
| RI SSD | 1.0 ms      | 3 /GB/S        |
| HE HDD | 10 ms       | 3 /GB/S        |

250 RI SSD Characteristics

|        | Raw Data Capacity | Access Density | IOPS of Hot data | Usable Hot Data | "Fast / Cold" Data Capacity |
|--------|-------------------|----------------|------------------|-----------------|------------------------------|
| RI SSD | 10 TB             | 3 /GB/S        | 6 /GB/S          | 5 TB            | 5 TB                         |

300 IOPS Utilization vs. RI SSD Capacity

350 IOPS Utilization vs. HE SSD Capacity

DATA STORAGE SYSTEM PERFORMANCE MANAGEMENT

BACKGROUND

The present disclosure generally relates to electronic data storage systems. In particular, this disclosure relates to managing the performance of a multi-tiered data storage system of a computer system.

Flash memory is a type of nonvolatile electronic memory device that stores and erases data in units referred to as "blocks." A block stored on a flash memory chip must be erased before data can be written, or programmed, to the chip. Flash memory retains data for an extended period of time whether a flash chip is powered on or off. Flash memory is widely used for storage and data transfer in consumer devices, enterprise systems and industrial applications.

A solid-state drive (SSD) is a nonvolatile storage device that stores data persistently on one or more solid-state flash memory devices. SSDs differ from hard disk drives in that there are no moving parts involved in an SSD. A traditional hard disk drive (HDD) includes a spinning magnetic disk with a read/write head mounted on a mechanical arm or "actuator." An SSD, by contrast, includes an array of semiconductor memories organized, electrically and logically, as a disk drive, using integrated circuits (ICs) rather than magnetic or optical storage media, to store data. An SSD may also be referred to as a "solid-state disk."

SUMMARY

Embodiments may be directed towards a computer-implemented method for dynamically managing performance of a data storage system of a computer system. The computer system can include at least one computer processor circuit communicatively coupled to the data storage system. The data storage system can include a first set of data storage devices, a second set of data storage devices that includes at least one read-intensive (RI) solid-state drive (SSD) and a third set of data storage devices. The computer system can also include at least one non-transitory computer-readable storage medium having program instructions embodied therewith. The program instructions can be executable by the at least one computer processor circuit to cause the at least one computer processor circuit to perform a method. The method can include detecting, in response to a specified number of input/output operations per second (IOPS) of data contained on the second set of data storage devices exceeding an access density of the second set of data storage devices divided by a portion of data locations of the second set of data storage devices containing the data, a free area. The free area can be within second set of data storage devices, and have space for additional data. The method can also include, within the data storage system, additional data having a required access time that is less than a specified access time threshold, the additional data also having an access frequency that is less than a specified access frequency threshold. The method can also include moving, in response to the detecting of the free area having space for additional data, the detected additional data to the free area within the second set of data storage devices.

Embodiments may also be directed towards a computer program product for dynamically managing performance of a data storage system of a computer system. The computer system can include at least one computer processor circuit communicatively coupled to the data storage system. The data storage system including a first set of data storage devices, a second set of data storage devices that includes at least one RI SSD and a third set of data storage devices. The computer program product can include at least one non-transitory computer-readable storage medium having program instructions embodied therewith. The program instructions can be executable by at least one computer processor circuit to cause the at least one computer processor circuit to perform a method. The method can include detecting, in response to a specified number of IOPS of data contained on the second set of data storage devices exceeding an access density of the second set of data storage devices divided by a portion of data locations of the second set of data storage devices containing the data, a free area. The free area can be within second set of data storage devices, and have space for additional data. The method can also include, within the data storage system, additional data having a required access time that is less than a specified access time threshold, the additional data also having an access frequency that is less than a specified access frequency threshold. The method can also include moving, in response to the detecting of the free area having space for additional data, the detected additional data to the free area within the second set of data storage devices.

Embodiments may be directed towards a computer system configured to dynamically manage performance of a data storage system of the computer system. The computer system can include at least one computer processor circuit communicatively coupled to the data storage system. The data storage system can include a first set of data storage devices, a second set of data storage devices that includes at least one RI SSD and a third set of data storage devices. The at least one computer processor circuit can also be communicatively coupled to at least one non-transitory computer-readable storage medium having program instructions embodied therewith. The program instructions can be executable by the at least one computer processor circuit to cause the at least one computer processor circuit to detect, in response to a specified number of IOPS of data contained on the second set of data storage devices exceeding an access density of the second set of data storage devices divided by a portion of data locations of the second set of data storage devices containing the data, a free area, within the second set of data storage devices, having space for additional data. The program instructions can also be executable to cause the at least one computer processor circuit to detect, within the data storage system, additional data having a required access time that is less than a specified access time threshold, the additional data also having an access frequency that is less than a specified access frequency threshold. The program instructions can also be executable to cause the at least one computer processor circuit to move, in response to the detecting of the free area having space for additional data, the detected additional data to the free area within the second set of data storage devices.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
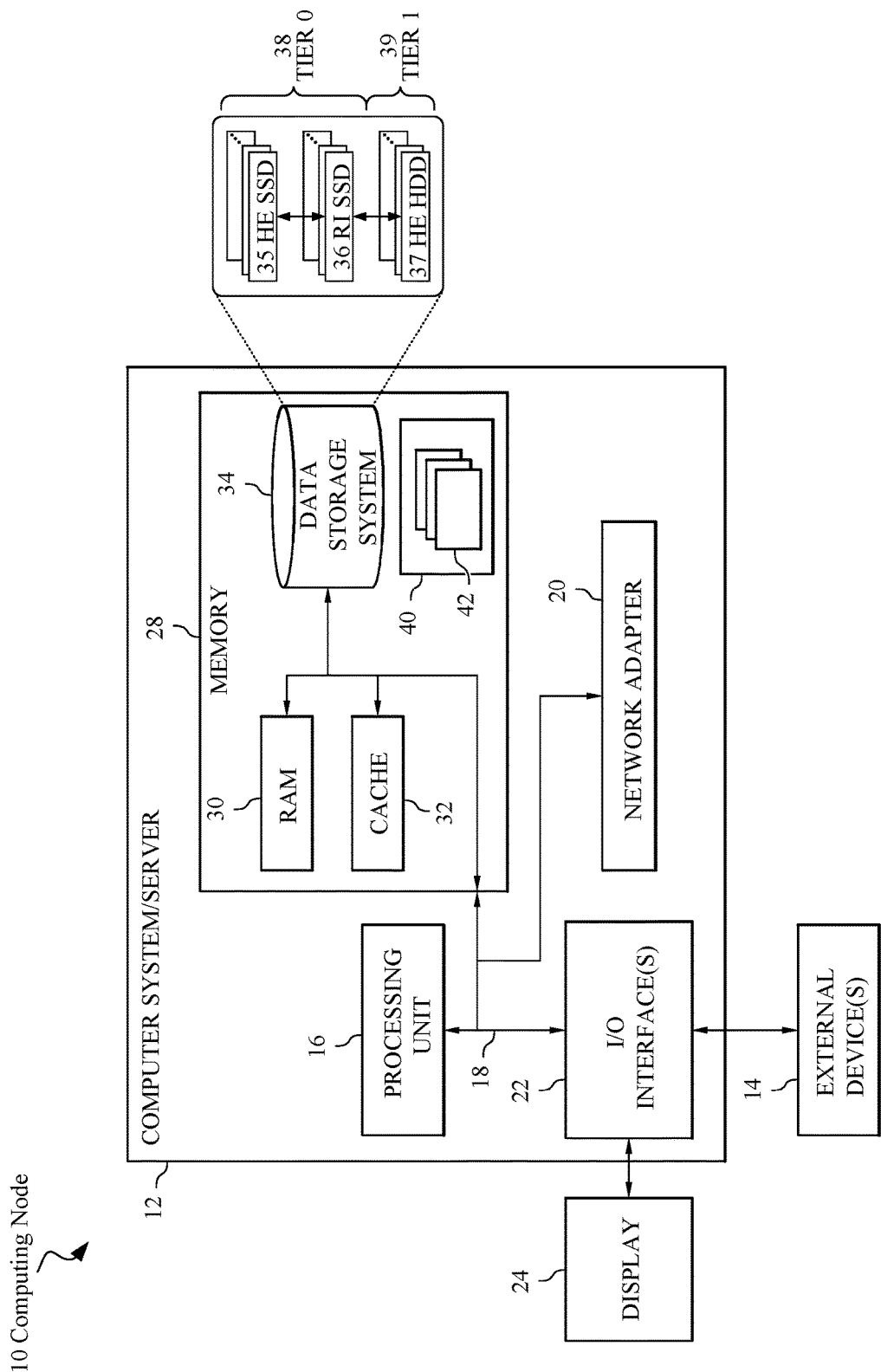
FIG. 1 depicts a block diagram of a computing node having a tiered data storage system, according to embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

In the drawings and the Detailed Description, like numbers generally refer to like components, parts, steps, and processes.

DETAILED DESCRIPTION

Certain embodiments of the present disclosure can be appreciated in the context of providing enhanced data storage performance management to electronic equipment such as servers, which may be used to provide data to clients attached to a server through a network. Such servers may include, but are not limited to web servers, application servers, mail servers, and virtual servers. While not necessarily limited thereto, embodiments discussed in this context can facilitate an understanding of various aspects of the disclosure. Certain embodiments may also be directed towards other equipment and associated applications, such as providing enhanced data storage performance management to electronic equipment such as computing systems, which may be used in a wide variety of computational and data processing applications. Such computing systems may include, but are not limited to, supercomputers, high-performance computing (HPC) systems, and other types of special-purpose computers. Embodiments may also be directed towards providing enhanced data storage performance management to computing systems such as personal computers (PCs) and small office/home office (SOHO) equipment.

Certain embodiments relate to the performance management of multi-tiered data storage systems used in conjunction with computing nodes/systems. FIG. 1 depicts a block diagram of an example computing node 10 having a tiered data storage system 34, according to embodiments of the present disclosure. According to embodiments, tiered data storage system 34 includes tier 0 38 and tier 1 39. Tier 0 38 contains a first set of at least one high-endurance solid-state drive (HE SSD) 35 and a second set of at least one read-intensive solid-state drive (RI SSD) 36, and tier 1 39 contains a third set of at least one high-end hard disk drive (HE HDD) 37. In embodiments, each of the HE SSD 35, RI SSD 36 and HE HDD 37 can each include either single or multiple data storage devices, i.e., SSDs/HDDs, according to a particular data storage system 34 configuration(s). It can be understood that the descriptors "tier 0" and "tier 1" are generally consistent with terminology used within the data storage system industry.

Each of the types of data storage devices HE SSD 35, RI SSD 36 and HE HDD 37 can possess a unique combination of device characteristics including, but not limited to, data capacity, endurance, data access time, access density and cost. A data storage system 34 can be designed to incorporate a particular combination of the data storage device types, i.e., HE SSD 35, RI SSD 36 and HE HDD 37, that takes advantage of their beneficial characteristics while minimizing the disadvantages of each device type. Various data storage capacities can be provided by each data storage device, in accordance with the needs of data storage system 34 and/or computer system 12.

According to embodiments, a data storage system for use with a computer system can be designed to take advantage of the beneficial characteristics of a variety of data storage devices such as HE SSDs, RI SSDs and HE HDDs. The access characteristics of certain data within the data storage system, such as a required or specified access time or access frequency, however, may change over time, in response to data usage patterns by software applications. For example, a required or specified access time or access frequency of certain data may either increase or decrease over time, which may result in a mismatch between the desired access characteristics of the data and the data storage device containing the data. Embodiments of the present disclosure may be useful for dynamically detecting both the access characteristics of data and suitable areas within the various data storage devices to contain the data. In response to these detections, appropriate movements of certain data between the various data storage devices may be triggered. These movements can be useful in managing and/or optimizing the overall performance of both the data storage system and an interconnected computer system.

Computing node 10 is only one example of a suitable computing node and is not intended to suggest any limitation as to the scope of use or functionality of embodiments of the invention described herein. Regardless, computing node 10 is capable of being implemented and/or performing any of the functionality set forth herein.

In computing node 10 there is also a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive").

Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
FIG. 2 includes two tables detailing data storage device access time, access density and read-intensive solid-state drive (RI SSD) performance characteristics, according to embodiments consistent with the figures.
Figure 2:

FIG. 2 includes two tables 200 and 250 detailing data storage device access time/access density and RI SSD performance characteristics, respectively, according to embodiments consistent with the figures. Table 200 lists example access times and access densities for HE SSDs, RI SSDs, and HE HDDs. Table 250 lists a variety of example performance characteristics for RI SSDs. The example data listed in tables 200 and 250 can be useful in illustrating performance differences between various data storage device types and RI SSD performance characteristics, respectively; however, this data is not to be construed as limiting. Various data storage devices can possess a range of access times, access densities and other performance characteristics.

For ease of discussion, the terms "response time" and "access time" are used interchangeably herein, with reference to a time required for a data storage system to perform, in response to a command issued to it, a read or write operation. It can be understood that access/response times may be measured/specified as average times over a relatively large sample of read/write operations. Access times of modern data storage devices such as HDDs and SSDs can be specified in ms.

The term "input/output operations per second" (IOPS) is used herein in reference to a performance metric useful for characterizing the performance of data storage devices such as HE HDDs, RI SSDs and HE SSDs. The IOPS of a data storage device can serve as a useful indicator of the overall throughput of the device, and the level of data read/write performance it can supply to a computing system. Data storage device(s) having high IOPS can enable relatively high performance of a computing system, whereas devices having a low IOPS can serve to limit/bottleneck the performance of a computing system. The IOPS of data storage devices such as HDDs and SSDs can be specified in number of I/O operations per second.

It can be understood that other performance metrics such as I/O bandwidth can also be useful in characterizing and specifying the performance of data storage devices. Each type of data storage device, e.g., HE HDD, RI SSD and HE SSD, can have different bandwidth limitations, similar to IOPS limitations. Bandwidth limitations can be specified in terms of amount of data per unit of time, e.g., MB per second.

Table 200 includes example access times and access densities for data storage devices, a combination of which may be used within a data storage system 34, FIG. 1. The numbers listed in table 200 represent performance of data storage devices under a workload including 50% read and 50% write operations arranged in a random order.

The term "access density," as used in table 200, refers to a performance metric that is a ratio of performance, i.e., IOPS, to the storage capacity, i.e., GB, of the data storage device. An access density of a data storage device can be useful as an indicator of an overall throughput provided for a particular amount of data stored on the data storage device.

A data storage device may be able to store a relatively large amount of data, however if the access density is relatively low, the data storage device may not be able to provide access to the data rapidly enough to meet the throughput needs of an interconnected computing system. Thus, relatively low access density of a data storage device can effectively limit the performance of the computing system, while relatively high access density can enable enhanced compute system performance. The access density of data storage devices such as HDDs and SSDs can be specified in number of IOPS per unit of data storage, per unit time. For example, access density may be specified in IOPS/GB/S.

The term "cold data" is used herein in reference to data having a relatively low "access frequency," relative to the access frequency of other types of data. An access frequency of data can be understood to be a metric specifying the number of read/write accesses made to a particular group of data per unit of time. For example, an access frequency of particular data may be 100/S. Similarly, the term "hot data" is used herein in reference to data having a relatively high access frequency relative to the access frequency of other types of data.

The term "fast data" is similarly used herein in reference to data having a relatively low specified or required access time relative to the access/response time of other types of data. The term "slow data" is used in reference to data having a relatively high specified access time relative to the access/response time of other types of data. It can be understood that a specified or required access time for data represents a maximum average access time which must be supported by the data storage device in order to meet the needs of the data storage system, computer system, and/or software applications accessing the data. Table 200 includes example access time and access density characteristics of data storage devices HE SSDs, RI SSDs, and HE HDDs.

HE SSDs, also known as "enterprise class SSDs," are generally fabricated using multi-level cell (MLC) flash memory technology, which can result in HE SSDs having relatively high endurance, i.e., a relatively long lifespan. HE SSDs have relatively fast/low access times, e.g., 0.7 ms, and high access densities, e.g., 125/GB/S, relative to both RI SSDs and HE HDDs. HE SSDs can be relatively expensive when compared to both RI SSDs and HE HDDs, and can have limited data storage capability relative to HE HDDs. The above-listed characteristics of HE SSDs can make them useful, within a data storage system, for containing selected data requiring both low access times and high access frequencies, i.e., that is both "fast" and "hot."

RI SSDs are generally fabricated using NAND flash memory technology, which can result in RI SSDs having lower endurance, i.e., being able to tolerate fewer write operations than HE SSDs. RI SSDs have relatively fast/low, access times, e.g., 1.0 ms, as compared to HE HDDs, and have relatively low access densities, e.g., 3/GB/S, relative HE SSDs. RI SSDs can be relatively inexpensive relative to HE SSDs, and have limited data storage capability relative to HE HDDs. The above-listed RI SSD characteristics can make them useful, within a data storage system, for containing selected read-intensive data requiring low access times and a mixture of low and high access frequencies, i.e., "fast but cold" and "hot" data.

HE HDDs, also known as "enterprise class" or "enterprise" hard drives can generally have faster access times than other types of HDDs, due to higher rotational speeds and relatively large integrated caches. HE HDDs generally have significantly higher access times, e.g., 10 ms, than HE SSDs and RI SSDs, and have relatively low access densities, e.g., 3/GB/S, relative HE SSDs. HE HDDs can be relatively inexpensive relative to both HE SSDs and RI SSDs, and can have significantly greater endurance and data storage capability than HE SSDs and RI SSDs. The above-listed HE HDD characteristics can make them useful, within a data storage system, for inexpensive, bulk data storage for data not requiring low access times.

Certain data storage systems can include two types of data storage devices, for example, HE SSDs and HE HDDs. Because HE SSDs have faster access times and significantly greater access densities than HE HDDs, management/optimization of data within such a system includes moving the "hottest" data onto the HE SSDs and allocating other data to the HE HDDs. In such a system the HE SSD is treated as "tier 0" and the HE HDD is treated as "tier 1".

Due to the relatively large storage capacity and economic advantages of using lower-cost RI SSDs, certain data storage systems can include three types of data storage devices: HE SSDs, RI SSDs and HE HDDs. In such a system, the HE HDDs are treated as tier 1, and the combination of HE SSDs and RI SSDs are treated as tier 0. According to embodiments, performance optimization of such a data storage system including three types of data storage devices can involve allocating the hottest data to both the HE SSDs and RI SSDs. Embodiments of the present disclosure can be useful in taking advantage of beneficial characteristics of each of the three types of data storage devices in order to manage and optimize data storage system performance.

Table 250 includes a set of example RI SSD data storage device characteristics. Such characteristics can be useful in illustrating and providing a general understanding of performance limitations inherent within RI SSD data storage devices. A raw data capacity, e.g., 10 TB, of an RI SSD can be understood to be a total data storage capacity of a single RI SSD or a set of RI SSDs. An access density, e.g., 3/GB/S, is a metric used to specify a maximum number of read/write accesses which can be performed on the RI SSD per unit of storage space, per unit of time. The listed access density of 3/GB/S indicates that 3 read/write accesses per second can be performed for each GB of the RI SSD's capacity. In this example, 3/GB/S*10 GB of raw capacity yields a total of 30 IOPS, maximum, that can be supported by the entire RI SSD device. In general, access density of a particular data storage device can depend on the device's functional organization/architecture and circuit design.

Following this example, the "IOPS of hot data" can represent a specified access frequency of hot data that is stored on the RI SSD. This value, e.g., 6/GB/S, can be specified by a user, hypervisor, operating system or software application, and can be specified so that data is provided to the application rapidly enough to not cause a bottleneck or slowdown of the application and/or computing system. It can be understood that a specified access frequency for data represents a minimum access frequency which must be supported by the data storage device in order to meet the needs of the data storage system, computer system, and/or software applications accessing the data.

In embodiments, various applications and/or computing systems may specify a variety of values for a specified access frequency. A "usable hot data," e.g., 5 TB, can be calculated by starting with the total maximum IOPS that can be supported by the entire RI SSD device, e.g., 30, and dividing it by the IOPS of hot data, e.g., 6. The resulting usable hot data of 5 TB represents the amount of data which can be stored on the RI SSD and accessed at the required access frequency, e.g., IOPS, of hot data of 6/GB/S. The fast/coldest data capacity is equal to the raw data capacity of 10 TB, minus the usable hot data of 5 TB.

Continuing with the present example, if an RI SSD having a 10 TB raw data capacity initially contains no data, and hot data having a required or specified IOPS of 6/GB/S is written to the RI SSD, the total maximum IOPS that can be supported by the entire RI SSD will be consumed when the RI SSD contains 5 TB of hot data. If hot data continues to be added to the RI SSD, the IOPS that is supported by the RI SSD will be insufficient to meet the specified/required IOPS of 6/GB/S. The described condition of a data storage device, e.g., an RI SSD, not being able to provide a particular specified IOPS for hot data can be referred to as the storage device being "overdriven."

A data storage device such as an RI SSD that contains the maximum amount of hot data that it can support at a specified access frequency can be used to contain additional data; however, the overall IOPS performance of the data storage device will be decreased if this additional data requires frequent access. Such a decrease of the overall IOPS performance of a data storage device can limit the overall performance of the data storage system as well as an associated computing system.

According to embodiments of the present disclosure, such an area within a data storage device can be useful for storing "fast but cold" data that requires relatively low access times, but is not accessed frequently. Aspects of the embodiments can detect suitable area(s) within a particular data storage device for storing fast but cold data, can detect fast but cold data on other data storage devices and can subsequently move the data to the suitable fast but cold data storage area(s). It maybe understood, in accordance with table 200, that the access density of an RI SSD can be comparable to the access density of an HE HDD. Embodiments of the present disclosure can be useful in minimizing the effects of the relatively low access density of an RI SSD by allocating data having particular access characteristics to particular portions of the RI SSD.

Figure 3:
FIG. 3 includes two graphs depicting input/output operations per second (IOPS) vs. used capacity performance curves for RI SSDs and high-endurance (HE) SSDs, according to embodiments consistent with the figures.
Figure 3:
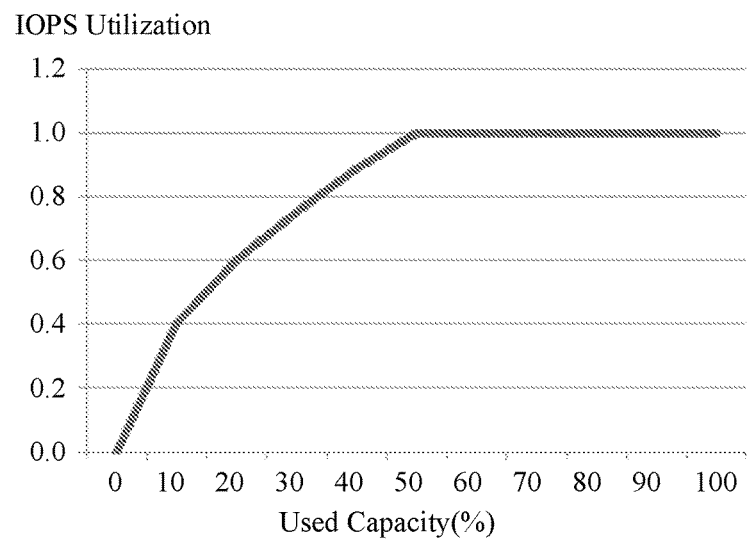
Figure 3:
Figure 3:
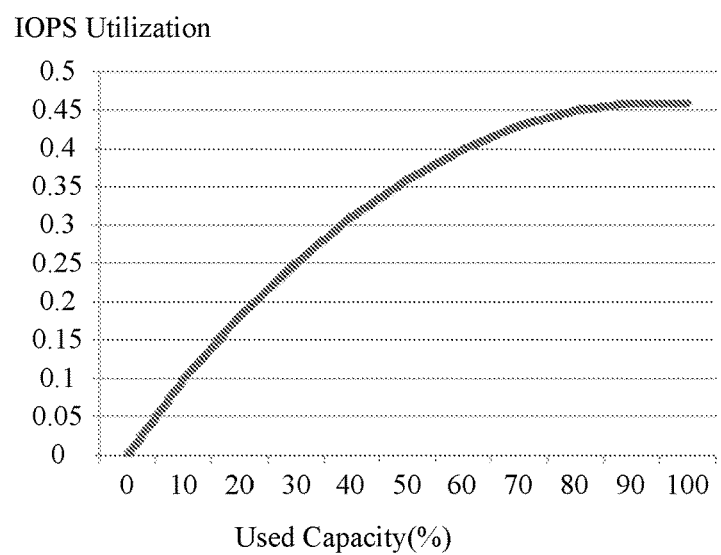

FIG. 3 includes two graphs 300 and 350 depicting example IOPS vs. used capacity performance curves for RI SSD and for HE SSDs, respectively, according to embodiments consistent with the figures. Graphs 300 and 350 can be useful in illustrating performance differences between HE SSD and RI SSD data storage devices and illustrating an "overdriven" condition of a data storage device. According to embodiments, both HE SSD and RI SSD data storage devices can be useful for storing hot data within a data storage system.

Graph 300 depicts IOPS utilization versus used capacity for an example RI SSD data storage device. As the used capacity of the example RI SSD device increases, i.e., as the device is filled with data, the IOPS utilization also increases, until the used capacity reaches approximately 50%, at which point the IOPS utilization has reached its maximum, i.e., 100%, value. If data is further added to the example RI SSD, the IOPS utilization does not increase, but remains at its 100% value, and is thus overdriven, as described in reference to table 250 of FIG. 2. Because the IOPS utilization peaks at a used capacity value of 50%, the remaining portion, i.e., 50%, of the RI SSD device cannot be effectively used to store hot data.

Graph 350 depicts IOPS utilization versus used capacity for an example HE SSD data storage device. As the used capacity of the example HE SSD device increases, i.e., as the device is filled with data, the IOPS utilization also continues to increase, until the used capacity reaches 100%, at which point the IOPS HE SSD is completely filled with data. In contrast to the example RI SSD device, the example HE SSD does not, throughout the entire range of used capacity, reach an overdriven condition that essentially limits the IOPS utilization of the HE SSD device. Thus, the entire data storage capacity of the HE SSD device is available for the storage of hot data.

Figure 4:
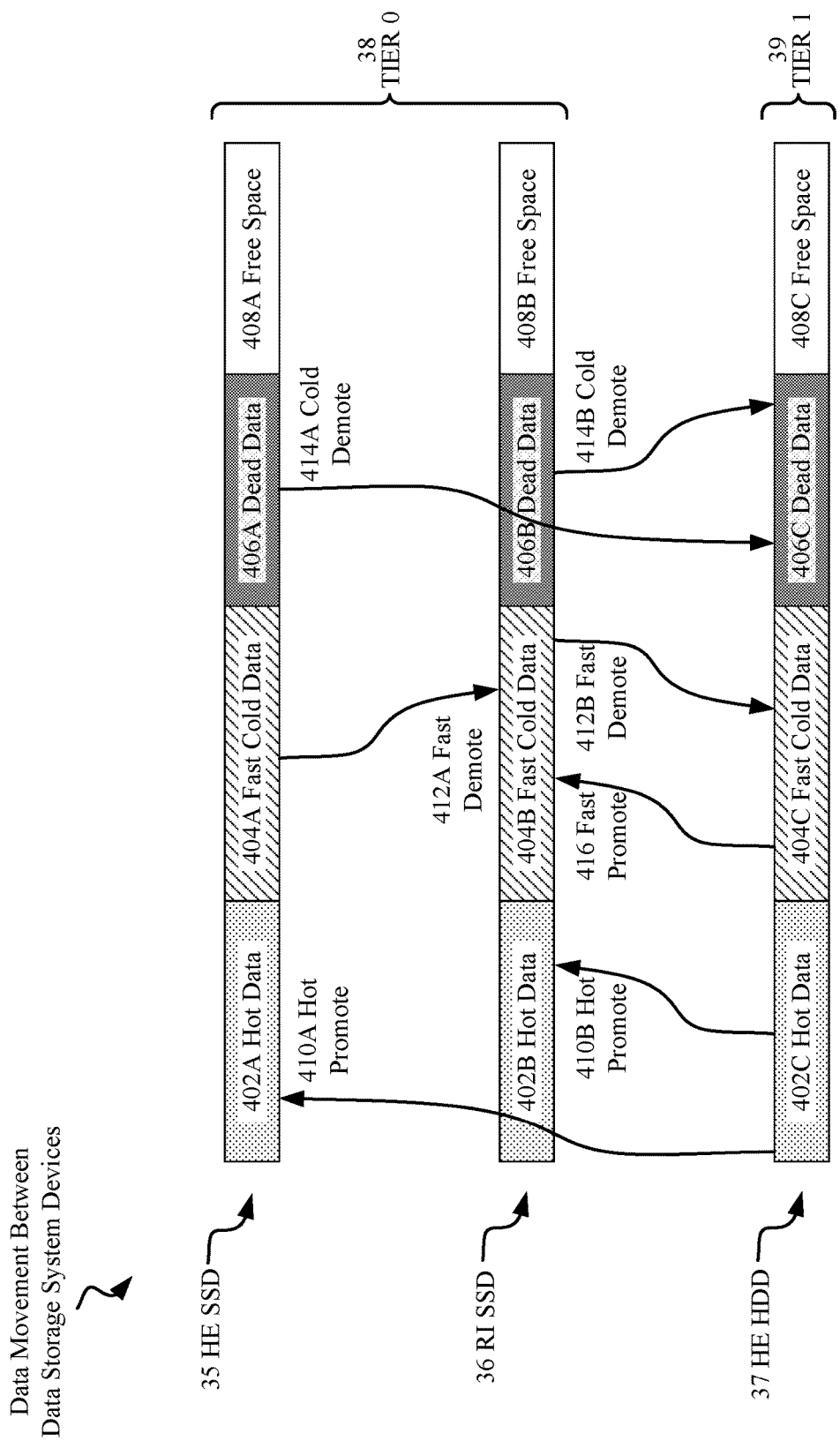
FIG. 4 is a block diagram depicting data movement between data storage system devices, according to embodiments consistent with the figures.

FIG. 4 is a block diagram which can be useful for depicting data movement between data storage system devices, according to embodiments consistent with the figures. FIG. 4 includes data storage system devices HE SSD 35 and RI SSD 36 within tier 0 38, and HE HDD 37 within tier 1 39, consistent with data storage system devices and tiers depicted in, and described in reference to, data storage system 34 of FIG. 1. The various types of data movements depicted between data storage system devices HE SSD 35, RI SSD 36 and HE HDD 37 can be useful for managing and optimizing the performance of a data storage system and a computing system including or in communication with a data storage system. Such management and/or optimization can result from the placement of data of various classes, each class having various access time and access frequency requirements, into data storage devices having appropriate and/or matching characteristics, e.g., access time and access density. Such matching and dynamic data movement can result in significant increases in overall data storage system/computing system performance.

Embodiments of the present disclosure can be useful in reducing or eliminating potentially unused or wasted data storage area present on an RI SSD that may result from the limited access density of such devices. Embodiments can be used to identify data which can benefit from the low access time of RI SSD, but which will not cause the RI SSD to become overdriven in use. Embodiments of the present disclosure can be efficiently integrated into the existing data storage systems and optimization methods.

According to embodiments, detection of both data access time and data access frequency requirements as well as data area sizes and characteristics is dynamic, i.e., can be performed in real time by the computing system in conjunction with the data storage system. In embodiments, movement of data between data storage devices is similarly dynamic. Such data and data storage area detection and resulting data movement can be useful in providing consistent, significant computing system performance improvements during the operation of a computing system to which the data storage system is attached.

Each of the data storage system devices HE SSD 35, RI SSD 36 and HE HDD 37 includes a consistent set of data storage areas suitable for containing a variety of different data classes, with each data class having unique access time and access frequency requirements. For example, "hot data" areas 402A, 402B and 402C can be used to contain a class of "hot" data that is accessed, e.g., through read or write operations, more frequently than other data classes. "Fast but cold" areas 404A, 404B and 404C can be used to contain "cold" data that is accessed less frequently than other data classes, but which requires relatively rapid access, i.e., low access times. "Dead data" areas 406A, 406B and 406C can be used to contain data that is accessed far less frequently than other data classes, and which does not need low access times when accessed. "Free space" areas 408A, 408B and 408C are areas containing no data, but which may be filled during subsequent data write operations into the data storage devices. It can be understood that following the moving of data to a portion of a "free space" area of a data storage device that the portion of the free space area then becomes a "hot" or "fast/cold" area, depending on which class of data has been stored within it. All of the above-described data areas can dynamically expand or contract as needed to contain data written into them during data movement operations described herein.

"Hot" or "cold" data may be detected by comparing the access frequency of the data to a specified access frequency threshold. If the access frequency of the data is less than the specified access frequency threshold, the data is determined to be "cold", otherwise the data is determined to be "hot". Similarly, "fast" data may be detected by comparing the access time of the data to a specified access time threshold. If the access time of the data is less than the specified access time threshold, the data is determined to be "fast."

In embodiments, the access frequency threshold and access time threshold can be specified by a computer system user, hypervisor, operating system or a particular software application(s) running on the computer system. Both access frequency thresholds and access time thresholds can be either static or dynamic, and may be changed in response to user input or to various computer system operating conditions and parameters.

An access frequency threshold can be set arbitrarily as a certain number of accesses per unit time, or in some embodiments, can be calculated in such a way as to segregate a particular group of data, i.e., the data on a certain data storage device, into a specified proportion of "hot" data and "cold" data. In one example, the access frequency threshold can be calculated so that 50% of the data on a certain data storage device is "hot" and 50% of the data is "cold." In another example, the access frequency threshold can be calculated so that 20% of the data on a certain data storage device is "hot" and 80% of the data is "cold." In some embodiments, the access frequency threshold can be determined by a software application configured to preferentially assign hot data to data storage devices having relatively high performance, e.g., RI SSDs or HE SSDs. Similarly, setting of an access time threshold can be performed in order to segregate a particular group of data, i.e., the data on a certain data storage device, into a specified proportion of "fast" data and "slow" data, for example, in order to preferentially assign fast data to data storage devices having relatively high performance, and relatively slow data to relatively low performance data storage devices.

According to embodiments, various data movement operations, e.g., hot promote 410A and fast promote 416, depict "promote" operations, through which data is moved from a data storage device having relatively low performance to a data storage device having relatively high performance. For example, hot promote 410A moves data from HE HDD 37 which has higher access times and lower access density than HE SSD 35. Similarly, various "demote" data movement operations, e.g., fast demote 412A and fast demote 412B, depict demote operations, through which data is moved from a data storage device having relatively high performance to a data storage device having relatively low performance. For example, fast demote 412A moves data from HE SSD 35 which has lower access times and higher access density than RI SSD 36.

Some embodiments of the present disclosure can make particular use of a "fast but cold" data storage area within the RI SSD. Such a "fast but cold" area is available for use when the IOPS limit of the RI SSD has been reached, as discussed in reference to FIG. 2 and FIG. 3, and can be calculated dynamically based upon the workload and data placement and capacity of the data storage system. A fast but cold data area on the RI SSD can be a useful place to store "fast but cold" data, i.e., data requiring robust, i.e., fast read/write performance, but which is not frequently accessed. Fast but cold data can reside on any data storage device at any time, and embodiments introduce various new data movements to move it to RI SSD 36.

Embodiments of the present disclosure introduce several new types of data movement to a data storage system, as listed below. Each new type of data movement can make advantageous use of data storage device area by pairing particular data types with appropriate, matching data storage areas on the storage devices.

According to embodiments, the fast promote 416 operation can be used to move data from the fast cold data 404C area of HE HDD 37 to the fast cold data 404B area of RI SSD 36. Fast promote 416 can be useful in allowing data that is promoted to be accessed more responsively than from HE HDD 37 without creating additional workload on the RI SSD 36. In embodiments, the fast promote 416 operation can be performed in response to the detection of a fast cold data area on RI SSD 36 and the detection of fast but cold data on HE HDD 37. In some embodiments, fast promote 416 operation can be performed in response to a required or specified access time of the detected fast but cold data being less than an average access time of the HE HDD 37.

According to embodiments, the fast demote 412A operation can be used to move data from the fast cold data 404A area of HE SSD 35 to the fast cold data 404B area of RI SSD 36. Fast demote 412A can be useful in freeing up space on HE SSD 35 to contain additional hot data, as well as reducing the workload on RI SSD 36, as additional hot data can be moved from RI SSD 36 to HE SSD 35. In some embodiments, the fast demote 412A operation can be performed in response to the detection of a fast cold data area on RI SSD 36 and the detection of fast but cold data on HE SSD 35. In some embodiments, the detected fast but cold data on HE SSD 35 can be specified as fast by a user, or by metadata, and can be detected as transitioning from hot to cold.

In some embodiments, an available IOPS capability of the RI SSD 36 can be calculated according to the equation:

$$IOA_{RI\_SSD} = \Sigma(IO_0 + IO_1 + \ldots + IO_n) * (CA_{RI\_NEED}/(CA_{HE\_SSD} + CA_{RI\_NEED}))$$

where:

$IOA_{RI\_SSD}$=unused/available IOPS capability of the RI SSD 36

N=a number of data segments on RI SSD 36

$CA_{HE\_SSD}$=data storage capacity of the HE SSD 35

$CAR_{RI\_NEED}$=extra data capacity used for subsequent storage of "hot" data on RI SSD 36

$IO_n$=IOPS capability required by the $n^{th}$ data segment of the "N" data segments.

According to embodiments, because the HE SSD 35 is limited by data capacity rather than by performance, all of the data capacity $CA_{HE\_SSD}$ will be used to store the "hot" data. In contrast, the RI SSD 36 is limited by IOPS performance, not by data capacity, so the hot data that the RI SSD 36 can store is limited by the value of $IOA_{RI\_SSD}$.

For each data segment of the "N" data segments, the performance data $IO_n$ can be determined. Each of the "N" data segments can then be sorted by its "heat," or specified IOPS value, in order to optimize the "hottest" data first. In embodiments, during hot data placement, the hottest data can be placed, in parallel, onto HE SSD 35 and RI SSD 36 in order to achieve the fastest overall data storage system access speed. When the "hottest" data placement is stable, the HE SSD 35 capacity will be fully used, and the RI SSD 36 will have reached its IOPS limit, i.e., the data capacity $CA_{RI\_NEED}$ is fully used to store hot data.

Based on the equation described above, it can be determined if there is additional available space for fast but cold data on RI SSD 36. In some embodiments, fast promote 416 can be performed in response to the value of $IOA_{RI\_SSD}$ indicating a lack of unused/available IOPS capability of the RI SSD 36. If additional space is available, performing a fast promote 416 can move additional cold but fast data from HE HDD 37 to RI SSD 36 to enable enhanced performance for that data.

In some embodiments, fast but cold data can also include metadata. Detecting additional fast but cold data can include detecting fast metadata, which can be used to provide I/O capability within the data storage system. Such metadata may not be accessed frequently, but it can be in the critical path of the data storage system and can have a critical impact on the overall storage performance, so fast access time for such metadata can be desirable.

According to embodiments, the fast demote 412B operation can be used to move data from the fast cold data 404B area of RI SSD 36 to the fast cold data 404C area of HE HDD 37. Fast demote 412B can be useful in freeing up space on RI SSD 36 for hot data, which can result in an overall data storage system performance improvement. In some embodiments, the fast demote 412B operation can be performed in response to the detection of fast but cold data on RI SSD 36 and the detection of fast but cold data 404C area on HE HDD 37. In some embodiments fast demote 412B can performed in response to detecting, on the HE HDD 37, a set of hot data larger than CAR' NEED, the data capacity used for subsequent storage of "hot" data on RI SSD 36. Performing a fast demote 412B can free up area on RI SSD 36 which may subsequently be used to hold hot data promoted from HE HDD 37.

According to embodiments, the hot promote 410A and hot promote 410B operations can be used to move data from the hot data 402C area of HE HDD 37 to the hot data 402A area of HE SSD 35 and to the hot data 402B area of RI SSD 36, respectively. Hot promote 410A and hot promote 410B can be useful in allowing hot data that is promoted to be accessed more responsively than from HE HDD 37, which can result in an overall increase in the performance of the data storage system. In embodiments, the hot promote 410A and hot promote 410B operations can be performed in response to the detection of hot data on HE HDD 37 and the detection of hot data 402A area of HE SSD 35 and a hot data 402B area of RI SSD 36, respectively.

In embodiments the migration of hot data can be accelerated by migrating it to both HE SSD 35 and RI SSD 36 in parallel. The ratio of the available data capacity, and thus the proportional amount of data to be migrated to both HE SSD 35 and RI SSD 36 can be specified by the ratio:

$$CA_{HE\_SSD} : CA_{RI\_NEED}$$

where:

$CA_{HE\_SSD}$=data capacity of the HE SSD 35

$CA_{RI\_NEED}$=extra data capacity used for subsequent storage of "hot" data on the RI SSD 36.

By migrating hot data according to this ratio, the capacity limit for both HE SSD 35 and RI SSD 36 is reached, and thus the hot data migration stops, simultaneously. According to embodiments, the hot data migration ratio between HE SSD 35 and RI SSD 36 can be adjusted dynamically. According to embodiments, moving the hot data in parallel to both HE SSD 35 and RI SSD 36 can be useful for balancing the workload of HE HDD 37 and RI SSD 36.

The term "dead data" is used herein in reference to data having both low required or specified access time and low access frequency relative to other data. In general, dead data may be accessed far less frequently than any other type of data present on the data storage system. While dead data may still be stored and accessed within the data storage system, neither its access time nor access frequency are generally of significant consequence to system users or software applications. In embodiments, in response to the specified access time being relatively low, and the access frequency being significantly below a specified access frequency threshold, i.e., the data is both slow and cold, a cold demote operation can be used to demote dead data to a dead data 406C area on HE HDD 37. For example, if the dead data is originally on HE SSD 35, cold demote operation 414A can be used to move it to HE HDD 37. Similarly, if the dead data is originally on RI SSD 36, cold demote operation 414B can be used to move it to HE HDD 37. Demoting dead data to HE HDD 37 can be useful for freeing up area on either HE SSD 35 or RI SSD 36 for additional hot or cold but fast data, which can result in enhanced overall storage system performance.

Figure 5:
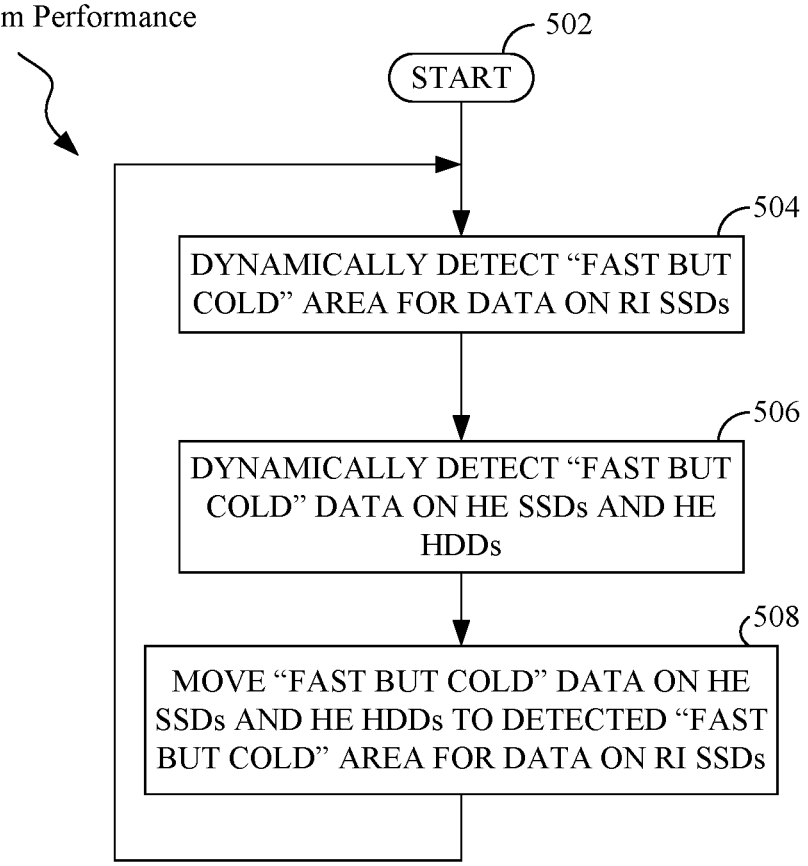
FIG. 5 is a flow diagram illustrating a method for managing data storage system performance, according to embodiments consistent with the figures.

FIG. 5 is a flow diagram illustrating a method for managing data storage system performance 500, according to embodiments consistent with the figures. The method for managing data storage system performance 500 can be useful for the placement of data of various classes, each data class having various access time and access frequency requirements, into data storage devices having appropriate and/or matching characteristics, e.g., access time and access density. Such data placement can be useful in managing and/or optimizing the performance of a data storage system and a computing system including, or in communication with, the data storage system.

The operations described herein in reference to the method 500 generally correspond to computing node 10, FIG. 1, and the block diagram depicting data movement between data storage system devices of FIG. 4, and their associated descriptions. With reference to FIG. 5, a single set of data area detection, data detection and data movement operations is depicted and described. However, the operations depicted and described in reference is to blocks 504, 506 and 508 may not be construed as limiting, and can possess multiple forms and variations, consistent with those depicted and described in reference to FIG. 1 and FIG. 4.

The method 500 moves from start 502 to operation 504. According to embodiments, it can be understood that the invocation or execution of method 500 can be in response to a boot-up of computer system or the invocation of a computer program product configured to perform the method 500.

Operation 504 generally refers to detecting, within an RI SSD, a free area having space for the storage of additional fast but cold data, in response to the RI SSD being "overdriven." This detecting can include detecting of a required or specified number of IOPS of data contained on the RI SSD exceeding an access density of the RI SSD divided by a portion of data locations of the RI SSD containing the data. According to embodiments, the detecting may be performed by one or more processor circuits, one or more storage controllers connected to the RI SSD, or a combination of processor circuit(s) and storage controller(s).

In accordance with known and practiced computer data organization techniques, data stored within the RI SSD can be organized into groups including, but not limited to, "cache lines" or "lines," "blocks," or "pages." Characteristics of each data unit, for example a specified or required access time, a specified or required access frequency or IOPS, amount of data contained within each data unit and/or data storage area within the data storage device can be used by processor circuits and/or storage controllers in performing the free area detection operation. Such data characteristics can be stored, for example, as metadata within a data storage device, or within a storage controller or memory device integrated within or in communication with the storage controller. As data is accessed within the data storage system, the characteristics of each data unit may be dynamically updated in response to data accesses.

According to some embodiments consistent with FIG. 4, detection of data areas within data storage devices can include "fast but cold" data areas, "hot" data areas, free space within a data storage device and "dead data" areas. Each of these detection operations can be performed by a processor circuit and/or memory controller, in conjunction with data unit characteristics, as described above. Once a free area having space for the storage of additional fast but cold data detecting has been detected within an RI SSD, the method moves to operation 506.

Operation 506 is an operation that generally refers to detecting additional fast but cold data within the data storage system. According to embodiments, the detected fast but cold data has a required or specified access time that is less than a specified access time threshold, the additional data also having an access frequency that is less than a specified access frequency threshold. In some embodiments, the fast but cold data can be detected based upon the above-listed characteristics, and in some embodiments the fast but cold data can be detected based upon metadata supplied by a user, operating system, hypervisor, or software application running within the computing system. For example, a block or region of data can be "tagged" or marked by a software application as "fast but cold" so that the application can achieve rapid access to the data when it is required. Such marking of fast but cold data can be useful in enhancing the performance of both computing systems and the software applications running upon them.

According to embodiments, the detecting of data may be performed by one or more processor circuits, one or more storage controllers connected to the data storage system, or a combination of processor circuit(s) and storage controller(s). The operation of data detection can be performed through the use of data unit characteristics and metadata by processor circuits and/or storage controllers, similar to the operation of data area detection described in reference to operation 504.

According to some embodiments consistent with FIG. 4, detection of data within data storage devices can include "fast but cold" data, "hot" data and "dead data." Each of these detection operations can be performed by a processor circuit and/or memory controller, in conjunction with data unit characteristics, as described above. Once additional fast but cold data detecting has been detected within the data storage system, the method moves to operation 508.

Operation 508 generally refers to process operation of moving of detected fast but cold data to the detected fast but cold data area on the RI SSD 36. This data movement generally corresponds to data movement operations, particularly operations 412A, 412B, and 416, depicted and described in reference to FIG. 4. According to embodiments, the movement of detected fast but cold data can be performed by one or more processor circuits within the computing system and/or data storage system. It can be understood that fast but cold data can be moved into a free space of the RI SSD, which is immediately converted, in response, to a fast but cold data area. It can also be understood that, in response to the movement of data within the data storage system that the sizes and locations of various data storage areas within particular data storage devices can change, i.e., expand and/or contract dynamically. In some embodiments, fast but cold data can be moved within the data storage system to the RI SSD 36. In some embodiments, other types of data, e.g., hot data and dead data, can be moved in response to the detection of various data storage area types and data types, as described in reference to operations 504 and 506, in accordance with data movement operations described in reference to FIG. 4. Once the fast but cold data has been moved to the fast but cold data area on the RI SSD 36, the method returns to operation 504.

The return of method 500 to operation 504 can be useful in illustrating the dynamic nature of the method 500, involving a repeating sequence of detection of suitable data areas, detection of matching data, and subsequent movement of the detected data to the suitable data area. Consistent with FIG. 4, it may be understood that within a computing system/data storage system, a number of data detection, data area detection and data movement operations may be simultaneously in progress at any particular time, in the practice of the present invention. Such simultaneous execution of multiple operations is consistent with the operation of modern, robust computing systems configured to execute multiple processes simultaneously, in order to manage and optimize overall computing and storage system performance.

It can be to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
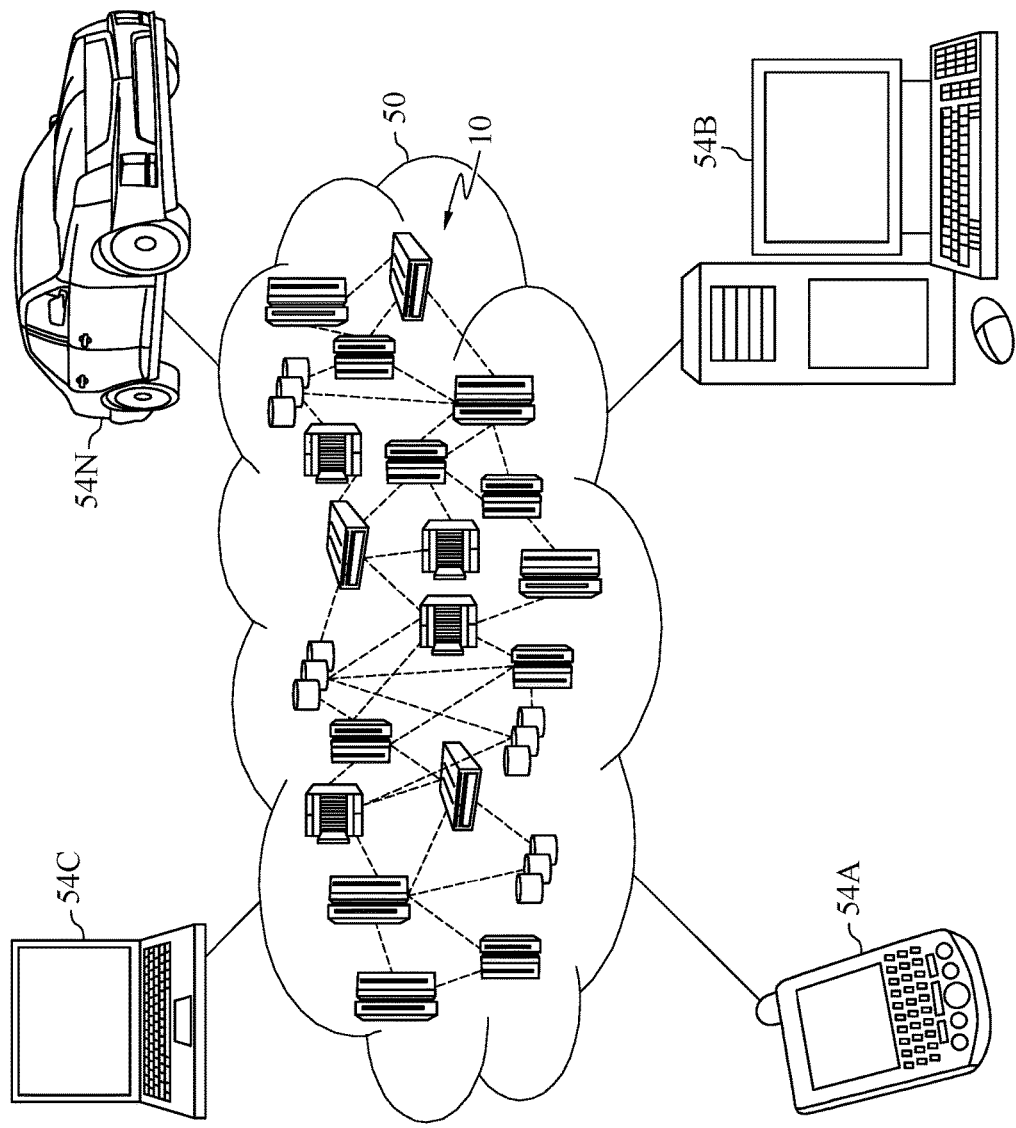
FIG. 6 depicts a cloud computing environment, according to embodiments consistent with the figures.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
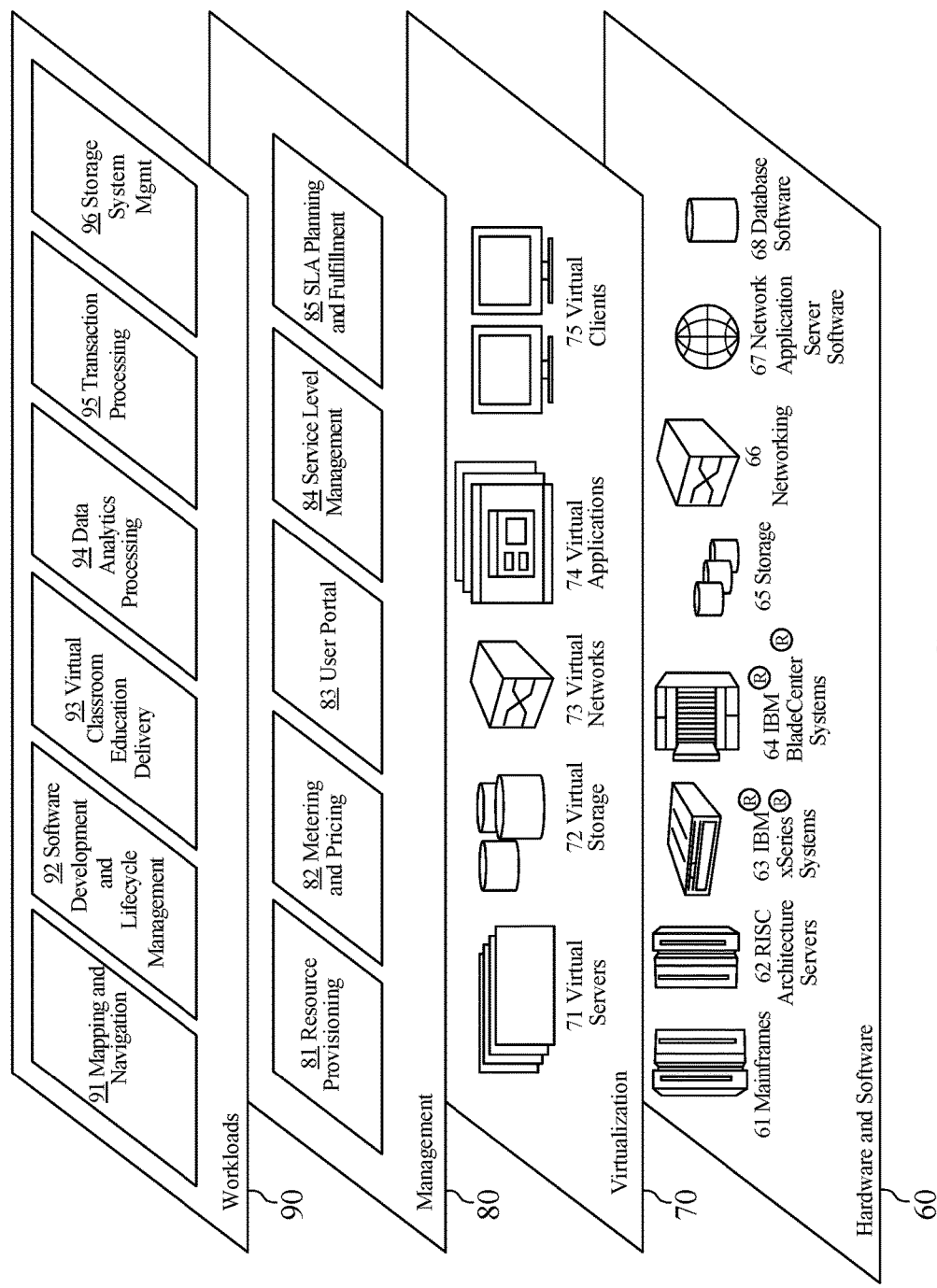
FIG. 7 depicts abstraction model layers, according to embodiments consistent with the figures.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and storage system management 96.

The present invention may be a method, a computing system, and/or a computer program product. The computer program product may include a non-transitory computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for dynamically managing performance of a data storage system of a computer system, the computer system including at least one computer processor circuit communicatively coupled to the data storage system, the data storage system including a first set of data storage devices, a second set of data storage devices that includes at least one read-intensive (RI) solid-state drive (SSD) and a third set of data storage devices, the computer system including at least one non-transitory computer-readable storage medium having program instructions embodied therewith, the program instructions executable by the at least one computer processor circuit to cause the at least one computer processor circuit to perform a method, the method comprising:

detecting, in response to a specified number of input/output operations per second (IOPS) of data contained on the second set of data storage devices exceeding an access density of the second set of data storage devices divided by a portion of data locations of the second set of data storage devices containing the data, a free area, within the second set of data storage devices, having space for additional data;

detecting, within the data storage system, additional data having a required access time that is less than a specified access time threshold, the additional data also having an access frequency that is less than a specified access frequency threshold; and moving, in response to the detecting of the free area having space for additional data, the detected additional data to the free area within the second set of data storage devices.

2. The method of claim 1, wherein the first set of data storage devices includes at least one high-endurance solid-state drive (HE SSD) and the third set of data storage devices includes at least one high-end hard disk drive (HE HDD).

3. The method of claim 2, wherein the required access time of the detected additional data is specified by an application run on the computer system.

4. The method of claim 2, further comprising calculating an unused and available IOPS capability of the second set of data storage devices according to the equation:

$$IOA_{RI\_SSD} = \Sigma(IO_0 + IO_1 + \ldots + IO_n)*(CA_{RI\_NEED}/(CA_{HE\_SSD} + CA_{RI\_NEED}))$$

wherein:

$IOA_{RI\_SSD}$=unused/available IOPS capability of the second set of data storage devices N=a number of data segments on the second set of data storage devices $CA_{HE\_SSD}$=data capacity of the first set of data storage devices $CAR_{RI\_NEED}$=extra data capacity used for subsequent storage of "hot" data on the second set of data storage devices $IO_n$=IOPS capability required by the $n^{th}$ data segment of the "N" data segments.

5. The method of claim 4, further comprising moving, in response to the value of $IOA_{RI\_SSD}$ indicating a lack of unused/available IOPS capability of the second set of data storage devices, the detected additional data from the third set of data storage devices to the free area within the second set of data storage devices.

6. The method of claim 4, further comprising, in response to detecting a set of data on the third set of data storage devices that has an access frequency greater than the specified access frequency threshold and detecting that the set of data is larger than $CA_{RI\_NEED}$:

detecting, on the second set of data storage devices, a second set of data having a required access time that is less than the specified access time threshold and having an access frequency that is less than a specified access frequency threshold, and moving, in response to the detecting of the second set of data, the second set of data from the second set of data storage devices to a free area within the third set of data storage devices.

7. The method of claim 4, further comprising:

detecting a set of data on the first set of data storage devices that has a first access frequency greater than the specified access frequency threshold and that has a subsequent second access frequency less than the specified access frequency threshold;

detecting that the set of data has a specified required access time less than the specified access time threshold; and moving the set of data from the first set of data storage devices to a free area within the second set of data storage devices.

8. The method of claim 2, further comprising:

detecting, on the third set of data storage devices, data having an access frequency that is greater than the specified access frequency threshold; and moving the detected data from the third set of data storage devices to at least one of the first set of data storage devices and the second set of data storage devices.

9. The method of claim 8, wherein a proportion of a first amount of data moved to the first set of data storage devices relative to a second amount of data moved to the second set of data storage devices is determined by the following ratio:

$CA_{HE\_SSD}:CA_{RI\_NEED}$ wherein:

$CA_{HE\_SSD}$=data capacity of the first set of data storage devices $CAR_{RI\_NEED}$=extra data capacity used for subsequent storage of "hot" data on the second set of data storage devices.

10. A computer program product for dynamically managing performance of a data storage system of a computer system, the computer system including at least one computer processor circuit communicatively coupled to the data storage system, the data storage system including a first set of data storage devices, a second set of data storage devices that includes at least one read-intensive (RI) solid-state drive (SSD) and a third set of data storage devices, the computer program product comprising at least one non-transitory computer-readable storage medium having program instructions embodied therewith, the program instructions executable by at least one computer processor circuit to cause the at least one computer processor circuit to perform a method comprising:

detecting, in response to a specified number of input/output operations per second (IOPS) of data contained on the second set of data storage devices exceeding an access density of the second set of data storage devices divided by a portion of data locations of the second set of data storage devices containing the data, a free area, within the second set of data storage devices, having space for additional data;

detecting, within the data storage system, additional data having a required access time that is less than a specified access time threshold, the additional data also having an access frequency that is less than a specified access frequency threshold; and moving, in response to the detecting of the free area having space for additional data, the detected additional data to the free area within the second set of data storage devices.

11. The computer program product of claim 10, wherein the first set of data storage devices includes at least one high-endurance solid-state drive (HE SSD) and the third set of data storage devices includes at least one high-end hard disk drive (HE HDD).

12. The computer program product of claim 11, wherein moving the detected additional data includes moving the detected additional data from the first set of data storage devices to the free area within the second set of data storage devices.

13. The computer program product of claim 11, wherein moving the detected additional data includes moving the detected additional data from the third set of data storage devices to the free area within the second set of data storage devices.

14. The computer program product of claim 13 wherein moving the detected additional data from the third set of data storage devices to the free area within the second set of data storage devices is initiated, in further response to a required access time of the detected additional data being less than an average access time of the third set of data storage devices.

15. A computer system configured to dynamically manage performance of a data storage system of the computer system, the computer system comprising:
   at least one computer processor circuit communicatively coupled to:
      the data storage system, the data storage system including:
         a first set of data storage devices;
         a second set of data storage devices that includes at least one read-intensive (RI) solid-state drive (SSD); and
         a third set of data storage devices; and
      at least one non-transitory computer-readable storage medium having program instructions embodied therewith, the program instructions executable by the at least one computer processor circuit to cause the at least one computer processor circuit to:
         detect, in response to a specified number of input/output operations per second (IOPS) of data contained on the second set of data storage devices exceeding an access density of the second set of data storage devices divided by a portion of data locations of the second set of data storage devices containing the data, a free area, within the second set of data storage devices, having space for additional data;
         detect, within the data storage system, additional data having a required access time that is less than a specified access time threshold, the additional data also having an access frequency that is less than a specified access frequency threshold; and
         move, in response to the detecting of the free area having space for additional data, the detected additional data to the free area within the second set of data storage devices.

16. The computer system of claim 15, wherein the first set of data storage devices includes at least one high-endurance solid-state drive (HE SSD) and the third set of data storage devices includes at least one high-end hard disk drive (HE HDD).

17. The computer system of claim 16, wherein the program instructions are executable by the at least one computer processor circuit to further cause the at least one computer processor circuit to:
   detect, in response to a specified number of IOPS of data contained on the third set of data storage devices exceeding an access density of the third set of data storage devices divided by a portion of data locations of the third set of data storage devices containing the data, a second free area, within the third set of data storage devices, having space for additional data; and
   move, in response to the detecting of the second free area having space for additional data, the detected additional data from the second set of data storage devices to the second free area within the third set of data storage devices.

18. The computer system of claim 16, wherein detecting the additional data includes detecting metadata having a required access time that is less than the specified access time threshold.

* * * * *